Nov. 22, 1966  M. L. JENTET  3,286,765
METHOD AND APPARATUS FOR AIR-CONDITIONING A VEHICLE
Filed June 22, 1964 2 Sheets-Sheet 1
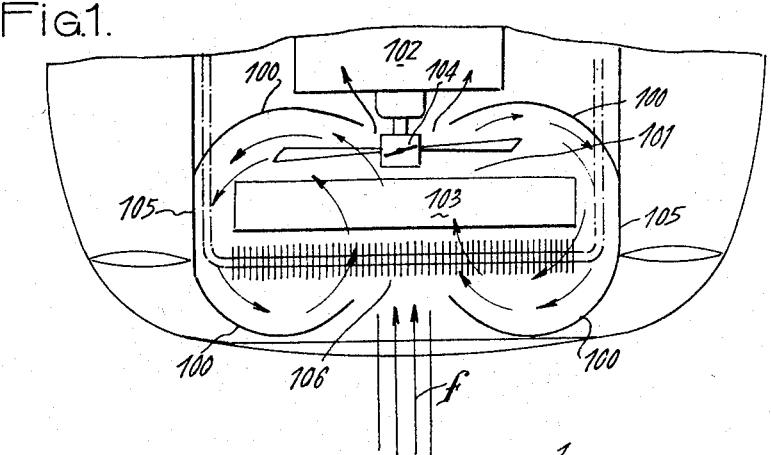
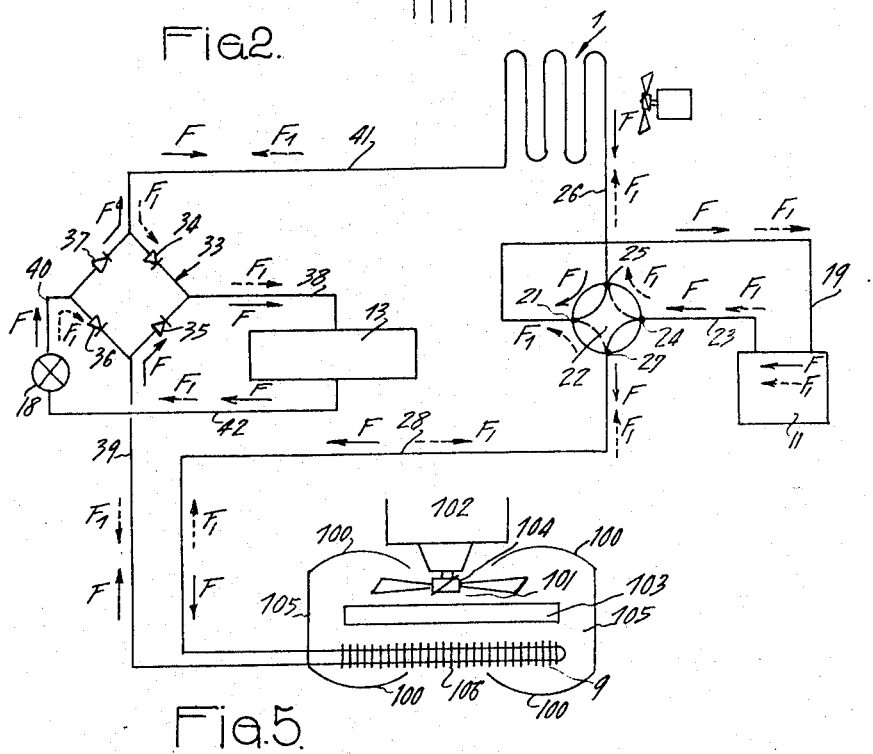
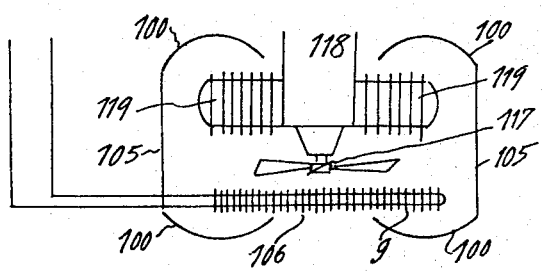
INVENTOR
MAXIME L. JENTET

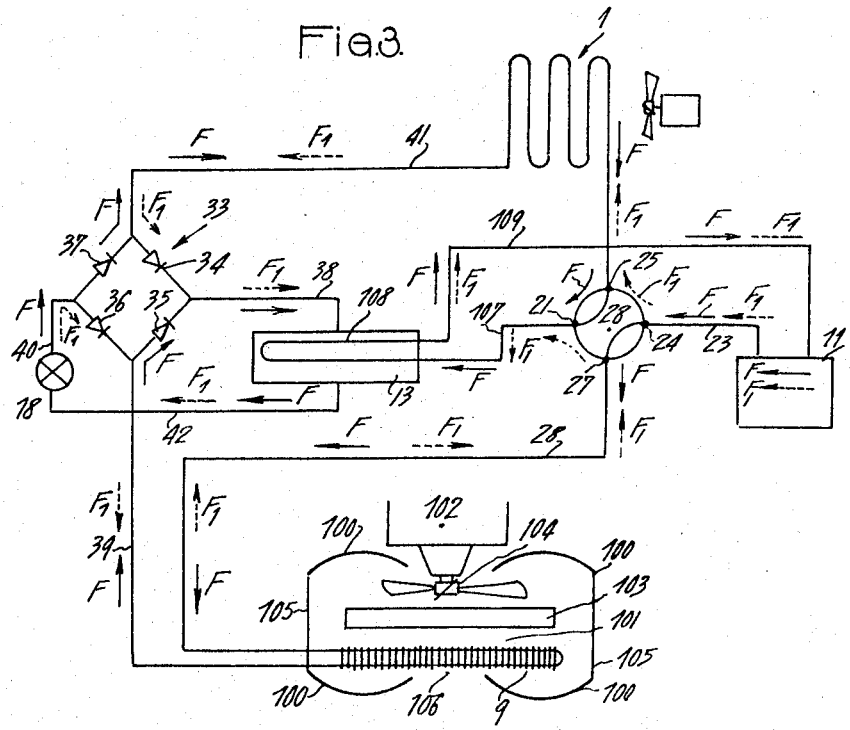

United States Patent Office 3,286,765
Patented Nov. 22, 1966

3,286,765
METHOD AND APPARATUS FOR AIR-CONDITIONING A VEHICLE
Maxime Louis Jentet, Chatou, France, assignor to Societe Anonyme des Usines Chausson, Asnieres, Seine, France, a company of France
Filed June 22, 1964, Ser. No. 376,737
Claims priority, application France, July 2, 1963, 940,151, Patent No. 84,616
5 Claims. (Cl. 165—2)

The present invention relates to improvements applied to the air-conditioning process and equipment, more particularly for vehicles, in which at least two heat exchangers are provided connected together and containing a charge of refrigerant fluid, one of the exchangers being placed in relation with the enclosure to be air-conditioned of the vehicle and the other exchanger in relation with the members for dispersing the heat of the engine of the vehicle, to cause, in this second exchanger, the evaporation of the refrigerant fluid that it contains, the steam produced being then made to condense in the first exchanger, which causes the rapid putting into circulation of the fluid between the two exchangers and the heating of said enclosure to be air-conditioned, such equipments may also comprise a compressor to ensure or accelerate the circulation of the fluid and its change of state.

The improvements according to the invention aim first of all at increasing the output of an equipment as above defined and more particularly, these improvements relate to means for improving the thermal link with the heat dispersion members of the engine so as to obtain an efficacious heating of the area to be air-conditioned, even with very low outside temperatures, at the same time that the engine is kept at an optimum working temperature.

The invention also applies not only to the device but also to a process.

According to the invention, the air-conditioning process, more particularly for vehicles, is characterized in that there is ensured, in an adjustable manner, a re-cycling of the air conveyed in thermal liaison with the member for dispersing the heat of the engine, this air being led on to the evaporator of the air-conditioning equipment, so that the refrigerant fluid evaporated in this evaporator is then condensed in a second exchanger arranged in the body of the vehicle and a second circuit being provided for reversing the circulation of the fluid in the equipment so that its evaporation is produced inversely in the exchanger inside the vehicle, whereas the re-cycling of the air is simultaneously stopped by adjustment of means controlling said recycling.

According to another characteristic of the invention, the device comprises adjustable re-cycling screens placed in the ventilation and cooling casing of the engine of the vehicle, so as partly to close said casing and surround the fan, the exchanger of the equipment forming an evaporator and the member for dissipating the heat of the engine, the screens being adjustably movable by hand or otherwise to stop the re-cycling of air when the refrigerant flow is reversed for cooling the interior of the vehicle.

Various other characteristics of the invention will moreover be revealed by the detailed description which follows.

Forms of embodiment of the invention are shown, by way of non-restrictive examples, in the attached drawings.

FIG. 1 is a diagrammatical view showing one embodiment of apparatus according to the invention and which performs according to the inventive process.

FIGS. 2, 3, 4 and 5 are diagrammatical views, on a smaller scale, illustrating various alternatives of the device and process according to the invention.

The device according to the invention comprises, in the form of embodiment chosen, re-cycling screens 100 advantageously placed in pairs in the casing 101 for ventilating and cooling the engine 102 of a vehicle, on either side of a cooling radiator 103 or other member for dissipating the heat of the engine. The screens partly enclose said radiator and a fan 104. These screens are half-shell shaped, for example, placed edge to edge with the walls 105 defining the intake casing 101, in the passage direction of the air, diagrammatized by the arrows $f$. The shells are separated from each other, so as to define a passage 106 of adjustable width, enabling the passage of the cooling air of the engine 102. In this manner, the cooling air supplied, either by the wind caused by the forward movement of the vehicle, or by the intake of the fan, passes through the opening in the passage provided between the shells of the first set arranged immediately behind the radiator shell. A part of this air continues its flow axially, whereas another part is driven by the blades of the fan on to the shells of the second set. The general shape of the shells subjects this air to an appreciably circular movement leading it towards the interior of the shells of the second set, so that it is re-cycled in the enclosure defined and flows over the radiator 103 several times before being evacuated through the rear opening of the passage.

If so required, to allow for the type of vehicle, its utilization conditions and the eventual necessity for modifying the efficaciousness sought, the shape of the screens, the air intake, the circulation of the air itself, can be modified to differ from the description given above.

According to FIG. 2, the above-mentioned device is included in an air-conditioning equipment which, for instance, comprises a compressor 11 whose intake piping is connected by a duct 19 to an outlet orifice 21 of a distributing member 22 with four ways. The delivery piping of this compressor 11 is connected by a duct 23 to an inlet orifice 24 of the same distributing member 22. The third orifice 25 of said member is branched by a duct 26 to the heat exchanger 1, placed inside the vehicle to be air-conditioned, and the fourth orifice 27 is connected by a duct 28 to a heat exchanger 9 in thermal relation with the members for dispersing the heat of the engine, and more particularly placed in front of the radiator 103 of the engine 102 for being partly surrounded, like the latter, by the re-cycling screens 100.

The two exchangers 1 and 9 are, moreover, connected by a reserve tank 13 constituting a receiver and an automatic expansion valve also called pressostatic valve 18 and this tank is placed, whether the equipment is used for heating or cooling, in the high pressure part of the circuit and upstream from the expansion valve. The circulation direction of the refrigerant fluid in the tank and expansion valve must thus be one-way, and to this end, a bridge 33 of non-return valves is interposed between the exchangers 1 and 9. This bridge comprises four non-return valves 34 to 37 mounted on the four branches of a closed circuit, which branches are connected in pairs to four ducts 38 to 41. The ducts 39 and 41 are connected to exchangers 9 and 1, whereas the ducts 38 and 40 lead to the tank 13 and pressure reducer 18 which communicate with each other by another duct 42. The valves 34 and 35 are branched in the same direction in relation to the duct 38 where the corresponding branches end of the closed circuit of the bridge 33, and likewise, with regard to the valves 36 and 37 in relation to the duct 40. However, the valves 35 and 36 are mounted in opposition in relation to the duct 39, just as are the valves 34 and 37 in relation to the duct 41.

When the refrigerant fluid circulates in the exchanger 9 forming a condenser, towards the exchanger 1, forming an evaporator, or cooler, it travels along the way shown in the drawing by the arrows F, passing through the valves 35 and 37 of the bridge 33. At this time the screens 100 are adjusted by any convenient means not to recirculate air over parts 9 and 103. When the refrigerant fluid flow is reversed and circulates from the exchanger 1 then forming a condenser towards the exchanger 9 forming an evaporator, it takes the direction shown by the arrows $F_1$ passing through the valves 34 and 36 of the bridge 33. At this time the screens 100 are adjusted in any convenient way to their positions in FIG. 2 so that air recirculation takes place over parts 9 and 103. We see that the fluid always circulates in the same direction through the tank 13 and the pressure reducer 18, whatever the circulation direction of the fluid in the equipment which is controlled by the distributing member 22.

According to the position of the distributing member 22 shown by the dotted line in the drawing and corresponding to the heating of the body of the vehicle, the refrigerant fluid circulates in the direction of the arrow $F_1$. This refrigerant fluid put into circulation by the compressor 11 passes into the exchanger 9 in which it must normally evaporate before being sucked in by said compressor and be discharged to condense in the exchanger 1 through which it heats the body of the vehicle. When the outside temperature is low, the thermal liaison with the dispersion members for heat and more particularly with the radiator 103, is too slight to cause the change of state and the evaporation of the refrigerant fluid. In this case, the re-cycling described above, set up by the screens 100, enables the temperature of the passage air to be considerably increased, and hence, to heat the exchanger 9 more intensely, which accelerates the change of state of the refrigerant fluid. In addition to a more efficacious heating thus obtained, the re-cycling planned enables the facilitating of the heating of the cooling liquid circulating in the radiator 103, and hence, causes the engine to run at a suitable temperature. This advantage is still greater in the case of an air-cooled engine, to which the invention applies in the same manner as stated hereafter with reference to FIG. 5.

In order to cover as wide a utilization temperature area as possible, it is advantageous to provide for the shells 100 or other deflectors to be adjustable crosswise, vertically and also individually by special partial rotation around a vertical axis or by any other means with a view to modifying the passage section defined and the re-cycling obtained. The adjustment of the shells 100 can be associated simultaneously, or singly, for operation by hand or by known mechanical or other means controlled by various comparison factors, more particularly, the outside temperature, the temperature of the air circulating on the radiator or engine, the temperature of the vehicle body, the temperature of the liquid circulating in the radiator 103, etc. The mode of controlling the adjustment or movement of screens 100 forms no part of the present invention since any conventional and known means for controlling such movement is contemplated.

FIG. 3 shows an alternative according to which the outlet orifice 21 of the distributing member 22 is connected by a duct 107 to an exchanger 108 which forms a regulating exchanger preferably placed inside the tank 13 arranged horizontally. This regulating exchanger 108 is connected by a duct 109 to the intake piping of the compressor 11.

In this form of embodiment, the presence of the regulating exchanger 108 enables a self-regulation of the circuit to be obtained and eliminates the risk of coolant fluid in liquid state being conveyed to the compressor 11. This exchanger is actually an exchanger for regulating the power consumed by the compressor 11, for it enables the pressure in the condenser 9 or 1 to be regulated, which pressure is opposed to the compressor and is equal to its delivery pressure.

In like manner to the foregoing, the refrigerant fluid is chiefly vaporized in the exchanger 9 by the re-cycling air set up by the screens 100. The fluid is then directed by the ducts 28 and 107 towards the regulating exchanger 108 which, in this case, also forms a supplementary evaporator in which the part that can still be liquid is vaporized before reaching the compressor through the duct 109.

Another alternative is shown by FIG. 4 in which the device is adapted to an air-conditioning equipment solely utilizing the compressor 11 for cooling the body of the vehicle, this compressor and regulating exchanger 108 being then short-circuited so that the heating of said body is ensured by an effect similar to the one called thermo-siphon.

In this example of FIG. 4, the exchanger 1 is connected to the outlet orifice 110 of a two-way cock 111 enabling said exchanger to be branched, either directly to the duct 28 leading to the exchanger 9, or to the duct 109, connected to the regulating exchanger 108. This exchanger is also connected by a duct 112 to the intake piping of the compressor 11 whose delivery piping is branched by a pipe 113 on to the duct 28 leading to the exchanger 9. The two-way cock 111 thus enables the regulating exchanger 108 and the compressor 11 to be placed in series, or else, as mentioned above, to short-circuit said regulating exchanger 108 and said compressor 11, for establishing a direct passage of the refrigerant fluid from the exchanger 1 to the exchanger 9.

The control of the two-way cock 111 is also coupled up to a valve 114 mounted on a by-pass 115 provided on a duct 116 directly connecting the tank 13 to the exchanger 1, on which duct is placed, between the by-pass, the automatic expansion valve 18. Another duct 116a ensures the liaison between the exchanger 9 and the tank 13.

In the FIG. 4 embodiment, when the control of the two-way cock 111 has short-circuited the compressor 11 and the regulating exchanger 108, the coolant fluid circulates in the direction of the arrow $F_1$, as it successively changes state in the exchanger 9 forming an evaporator and in the exchanger 1 forming a condenser. Actually, the coolant fluid evaporates in the exchanger 9 heated by the re-cycling air supplied by the screens 100. This fluid then condenses in the exchanger for air-conditioning 1 through which it heats the air of the body of the vehicle to be air-conditioned. For ensuring proper working, the exchanger 1 forming a condenser must be placed above the tank 13 which must itself be at a higher level than the exchanger 9, so that the working of the circuit takes place by means of the liquid column formed at the outlet from the exchanger 1 and the liquid tank 13.

As shown by FIG. 5, the device for operating the process can also be adapted on vehicles whose heat dispersion members do not comprise a radiator, as is the case, for example, with air-cooled engines. In such form of application, the re-cycling screens 100 partly surrounding, both the exchanger 9, a fan 117 and at least parts of the engine 118 producing the most heat, more particularly the cylinders 119 and eventually the exhaust manifold. The re-cycling effect produced makes the cooling air flow several times round the heat dispersion gills of the cylinders for increasing, as previously, the temperature of this air and more intensely heating the exchanger 9.

It should be noticed that this form of embodiment is most particularly advantageous, for the difficulty of heating the body of a vehicle comprising an air-cooled engine is well known, as it is more difficult thermically to regulate a ventilation that is variable as function of the utilization conditions of the vehicle, than a circulation of cooling liquid. This application of the re-cycling device also affords the considerable advantage of maintaining the cooling air of the engine at an optimum temperature, which is much more important than in the case of an engine cooled by liquid circulating in a radiator.

In an application of this kind, it may be advantageous to arrange the inlet opening of the channel 106 so that the cool air is directed on to the engine level with the parts to be more intensely cooled, like, for instance, the cylinder heads 119.

Whatever the embodiment or the type of equipment comprising the re-cycling device, it is obvious that, during the working of this equipment for cooling the interior of the body of the vehicle, the screens are completely free for adjustment so as not to hinder the ventilating of the engine and eventually the radiator and also the exchanger 9 which then forms a condenser that must be traversed by the coolest air possible.

The invention is not limited to the examples of embodiment shown and described in detail, for various modifications can be applied to them without going outside of its scope.

I claim:

1. A method for heating and cooling the inside of a vehicle having an internal combustion engine provided with heat dissipating means and also having a reversible cycle heat pump circuit operating with coolant fluid, comprising steps of circulating said coolant fluid in front of said heat dissipating means of the engine at one time in such a manner that ambiant atmospheric air is successively put first in thermal relation with said coolant fluid and second with said heat dissipating means for cooling of said engine whereby the coolant fluid is cooled allowing said reversible heat pump circuit to operate as a cooler for the inside of said vehicle, and at another time causing said ambient air passing over said heat dissipating means to be recirculated at least in part and to be brought several times in thermal relationship with said coolant fluid circulating in front of said heat dissipating means and with said heat dissipating means to transfer heat from said heat dissipating means to said coolant liquid whereby the coolant fluid is heated allowing said reversible heat pump circuit to operate as a heater for the inside of said vehicle.

2. A heating and cooling system for selectively heating and cooling the inside of a vehicle driven by an internal combustion engine having heat dissipating means disposed in an air pasage, comprising a reversible cycle heat pump unit having a first heat exchanger in thermal relation with the inside of the vehicle and a second heat exchanger in thermal relation with the atmosphere in said air passage, control members for said reversible cycle heat pump unit to selectively operate the pump in one condition with said first heat exchanger working as an evaporator and said second heat exchanger as a condenser to cool the inside of the vehicle and in a second condition with said first heat exchanger working as a condenser and said second heat exchanger as an evaporator to heat the inside of the vehicle, and movable deflecting members mounted to surround at least in part said second heat exchanger and said heat dissipating means of said engine, said movable deflecting members when spaced apart permitting a passage of ambient air serially through said second heat exchanger and said heat dissipating means and when spaced closer together causing recirculation of air between said secondary heat exchanger and said heat dissipating means.

3. A heating and cooling system as set forth in claim 2 wherein said second heat exchanger is mounted in front of said heat dissipating means of said engine, said system further comprising a fan driven by said engine, and lateral walls surrounding said second heat exchanger, heat dissipating means and fan and delimiting a channel portion of said air passage into which air is sucked by said fan from outside to said second heat exchanger and heat dissipating means, said movable deflecting members being connected to said walls at both ends of said channel portion.

4. A heating and cooling system according to claim 3 wherein said reversible cycle heat pump unit further comprises a compressor, ducts connecting said first and second heat exchangers and compressor in series relation, and means for expanding a coolant fluid interposed in said ducts, said control members including a four way valve and a valve bridge adapted to reverse the direction of flow of coolant in said ducts to operate the unit as a cooler and heater under said two stated conditions.

5. A heating and cooling system according to claim 3 wherein said reversible cycle heat pump unit further comprises a compressor, ducts connecting said first and second heat exchangers and compressor in series relation, and means for expanding a coolant fluid interposed in said ducts, and wherein is further provided a regulation exchanger partly immersed in a tank which is connected in series with said compressor through a two-way cock and also in series with said means for expanding a coolant fluid and said first heat exchanger, said means having a bypass conduit including a valve coupled to said two-way cock for reversing the circulation of said coolant and eliminating action of the compressor and regulating exchanger.

References Cited by the Examiner
UNITED STATES PATENTS

| | | | |
|---|---|---|---|
| 2,474,304 | 6/1949 | Clancy | 62—324 |
| 2,662,748 | 12/1953 | Huber | 165—125 X |
| 2,900,805 | 8/1959 | Tilney | 62—324 X |
| 2,991,631 | 7/1961 | Ray | 62—324 |

ROBERT A. O'LEARY, *Primary Examiner.*

FREDERICK L. MATTESON, JR., *Examiner.*

M. A. ANTONAKAS, *Assistant Examiner.*